(No Model.)
M. M. SHELLABERGER.
BARB WIRE REEL HANDLE.
No. 264,778. Patented Sept. 19, 1882.
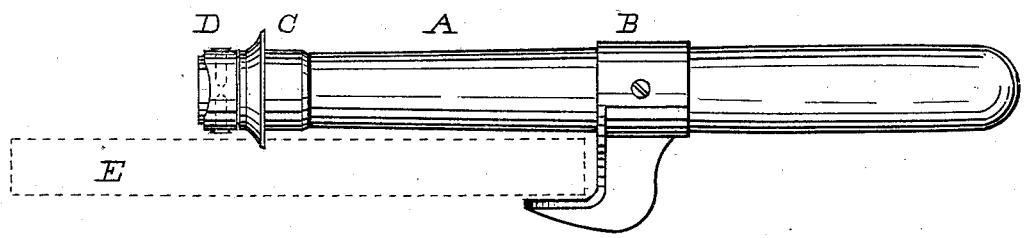
WITNESSES:
John Trautmann
Leopold Leibold
INVENTOR
Michael M. Shellaberger
BY B. Pickering
ATTORNEY

UNITED STATES PATENT OFFICE.

MICHAEL M. SHELLABERGER, OF DAYTON, OHIO.

BARB-WIRE-REEL HANDLE.

SPECIFICATION forming part of Letters Patent No. 264,778, dated September 19, 1882.

Application filed August 18, 1882. (No model.)

*To all whom it may concern:*

Be it known that I, MICHAEL M. SHELLABERGER, a citizen of the United States, residing at Dayton, in the county of Montgomery and State of Ohio, have invented a new and useful Implement entitled a "Barb-Wire-Reel Handle," of which the following is a specification.

My invention relates to a device for handling reels on which are wound barb-wire; and it consists of a wooden handle, to which is attached a hook to clasp the end of one of the cross-pieces forming the side of the reel, and on the end of which is secured an annular catch having a rim, which indents the wood, and thereby makes a secure holding.

The mechanism is illustrated in the accompanying drawing, in which a side view of the reel-handle is shown.

A represents a turned wooden handle, the right end of which is suitable to be grasped by the hand. Near the center is attached a hook, B, having a thimble embracing the handle, and at the end is secured a rotating annular catch, C, which is held between the shoulder of the handle and the collar D. The essential features are the handle, hook, and rotary catch. An upward projection may be attached to the lip of the hook, and this would obviate the necessity of the rim on the part C. The dotted lines at E represent the position of the cross-piece of the reel when it is caught by the handle. The object of the rotary catch is to readily release the hold on the reel, and thereby save the hand from injury by coming in contact with an obstruction.

Having fully described my invention, what I claim, and desire to secure by Letters Patent, is—

In a barb-wire-reel handle, a permanent hook and a rotary annular catch in combination, substantially as set forth.

MICHAEL M. SHELLABERGER.

Witnesses:
B. PICKERING,
JOHN HANITCH.